April 30, 1968     J. C. REDMOND     3,380,294

INERTIAL IMPACT PROBE INSTRUMENT

Filed Aug. 24, 1964     2 Sheets-Sheet 1

JOHN C. REDMOND
*INVENTOR.*

BY

ATTORNEY

April 30, 1968   J. C. REDMOND   3,380,294
INERTIAL IMPACT PROBE INSTRUMENT
Filed Aug. 24, 1964   2 Sheets-Sheet 2

JOHN C. REDMOND
INVENTOR.

BY Charles W. Woodward
ATTORNEY 3,380,294
Patented Apr. 30, 1968

1

3,380,294
INERTIAL IMPACT PROBE INSTRUMENT
John C. Redmond, Fort Worth, Tex., assignor to General Dynamics Corporation, Fort Worth, Tex., a corporation of Delaware
Filed Aug. 24, 1964, Ser. No. 391,591
1 Claim. (Cl. 73—82)

The present invention relates generally to a means and method for determining the integrity and general character of the crustal surfaces of extraterrestrial bodies or other unknown surface media. More particularly the invention relates to an instrumented probe, operable for measuring and recording the resistance of penetration of a given crustal medium and further adapted to impact against and/or penetrate into such medium while simultaneously transmitting signals indicative of the object medium's character and condition and of the deceleration forces which it experiences during an operational cycle. The degree of deformation of the sphere and the deceleration force which is experienced by it is a resultant of the resistance to penetration of the medium being impacted or penetrated. The spherical probe is so designed as to obviate any need for its orientation prior to impact and penetration; any suitable system of accelerometers, spin rate indicators and degree-of-deformation signal means being acceptable and useful in the probe for this purpose.

Contemporary space exploration programs contemplate landing manned space vehicles on the surface of extraterrestrial bodies; initially on the earth's moon, before proceeding on to explore the near planets of the solar system, i.e., Mars and Venus. Before landing a manned vehicle on the surface of the moon, the integrity of its crustal periphery and the ability of that surface to sustain the space vehicle and its landing party together with related equipment must be established prior to committing the mission. This determination must be made in a manner which will not only permit, but also engender, a high confidence level in the prediction of the relevant surface properties at the landing locale consequently such determinations will necessarily include actual physical contact with the object surface in order to accurately assay the character of the medium in general and to obtain very close estimates of its bearing strength in particular.

It is therefore a primary object of the present invention to provide a novel means and method for measuring the penetration resistance of any unknown mass medium by measuring the deceleration of an instrumented body as it impacts and/or penetrates the object medium.

Another object of the invention is to provide an expendable, relatively simple, lightweight and inexpensive probe instrument for measuring the mass penetration resistance of an unknown surface medium with a plurality of these probe devices being impacted over a given area so that a high confidence level may be engendered in predicting the surface properties and characteristics indicative of that surface's ability to sustain a vehicle, crew and support equipment for a manned landing mission thereon.

A further object of the invention resides in the provision of a probe system of the above class and character that is not constrained, as to method of delivery, by the necessity for being pre-oriented prior to contact, especially in the absence of atmosphere.

A yet further object is to provide an expendable probe device such that a multiplicity of measurements may be taken over a relatively large area of the object surface medium, thus permitting cross-sections of its compartment to be plotted.

These and other objects and advantages of the invention will become readily apparent to those skilled in the art from the following description of the appended drawings, wherein.

Figure 1:
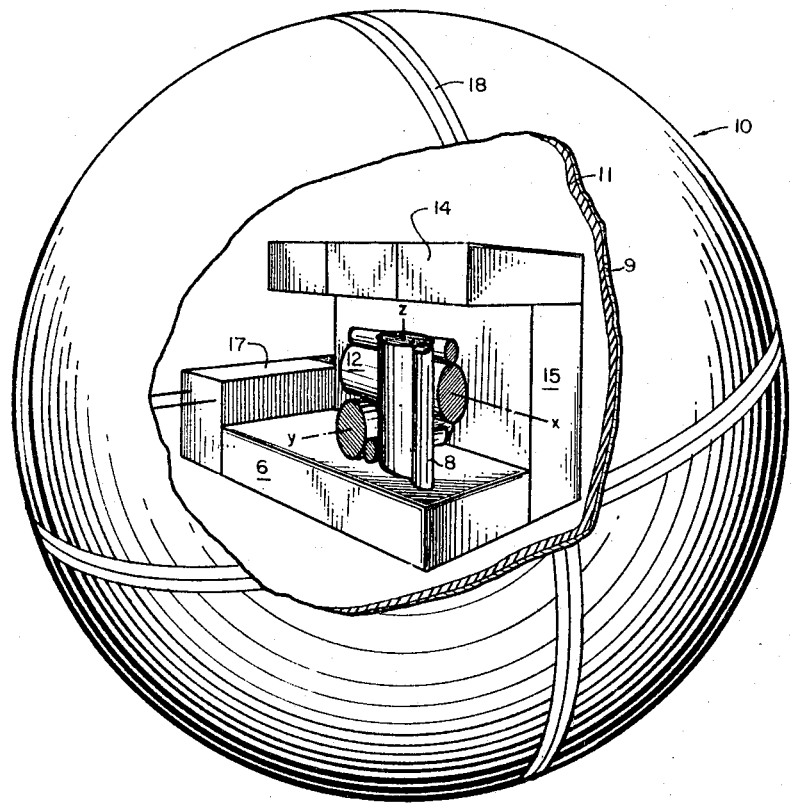
FIGURE 1 is a partially cut-away pictorial representation of the inertial impact probe instrument of the present invention.
Figure 2:
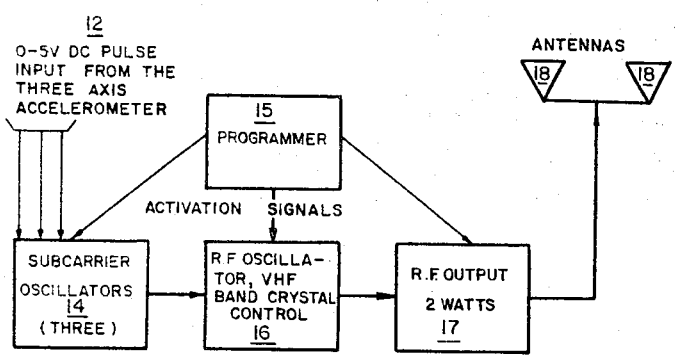
FIGURE 2 is a schematic block diagram of the signal generating, amplifying and telemetering components of the system.

Referring now to the drawings and particularly to FIGURE 1, there is shown the preferred form of the invention as embodied in a spherical inertial impact probe instrument 10 and consisting in a hollow spherical shell 11, made from relatively hard material such as stainless steel, which embodies three orthogonal decelerometers 12, rigidly mounted in spherical shell 11. These decelerometers are orientated and mounted in such manner that at least one is acting to measure components about either the lateral X, longitudinal Y, or normal Z axis, at any given attitude and at any given time. Thus the sphere does not have to be orientated in respect to some extraneous reference point prior to its impact as has heretofore been required of devices in the prior art.

Figure 3:
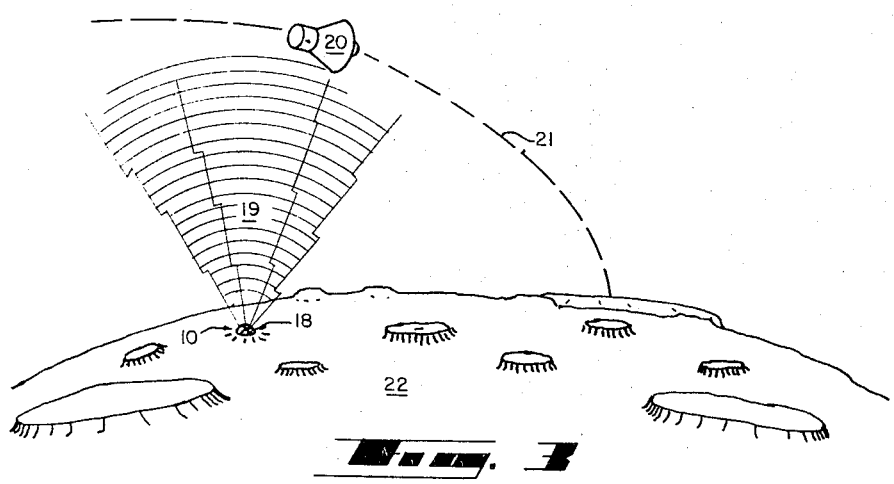
FIGURE 3 is a pictorial representation illustrating the mission and operational aspects of the inertial impact probe system of the present invention.

The signal input from the tri-axis accelerometer 12 is, in the preferred embodiment, a zero to five volt pulse which is fed into three subcarrier oscillators 14 having carrier deviation of about 40%. These pulses are monitored by programmer 15 and controlled by its activation signals as pulsed signal inputs to VHF band crystal control R.F. oscillators 16. These signals are then amplified and transmitted by an R.F. output of about 2 watts through VHF band amplifier/transmitter 17 via crossloop omnidirectional (0 db gain) antenna 18. Transmitted signals 19 (FIGURE 3) are received by the orbiting vehicle 20, moving along orbital path 21, out about 40–50 miles above the object surface, such as lunar surface 22. Preferably vehicle 20 will carry a conventional narrow band FM BW–350 kc., 2 sensitivity, receiver and will receive the transmitted signals through a flush mounted 0 db gain antenna (not shown).

All data 19 telemetered from probe 10 to vehicle 20 is in FM/FM form. This is to say that a frequency modulated subcarrier is employed to frequency modulate the main VHF carrier, and the inputs to the subcarrier oscillator 14 are either continuously transmitted or, in the case where there are many signals to be transmitted, they are multiplexed. A calibration voltage is employed to correctly interpret the frequency variation. This calibration voltage is preferably a 5 v. DC and may be taken from a Zener diode reference to be multiplexed with the error signal.

To insure optimum telemeter transmission, antenna 18 is omnidirectional in order to provide adequate coverage and is polarized. A plurality of circular phased band antennas are employed because the spherical probe 10 will be spinning during transmission. These antennas are preferably embedded in the outer surface but may be completely contained within the sphere. VHF frequency is employed because of the antenna length that is necessarily required for such circumferential disposition.

Three subcarrier channels 12 are preferred and are simultaneously employed. However, this parameter is determined by the number of data quantities to be received from any given probe and therefore is not a limiting factor. For example, embodiment of three orthogonal spin rate indicators would add to the quantity of information to be received from the probe and would necessitate the incorporation of three additional channels (not shown) for a total of six. Each discriminator is made selective to a specific frequency band around a subcarrier center frequency, and the output voltage is proportional to the deviation of the input signal from the center frequency.

The operator's console carried by vehicle 20 contains a scope readout (not shown) so that the operator can detect the impact timing of the probe.

A total of 3 watt hours of electrical energy is required to operate the programmer 15, timer 16 and transmitter 17. This power, in the preferred embodiment, is supplied by a small mercury battery 6 (FIGURE 1).

Data received from probe 10 by vehicle 20 will consist of the deceleration of the probe with time. Inasmuch as the curve of the resultant plot will be defined and bounded on a closed interval and continuous there except possibly for a few finite number of points, it is integrable over this interval. Thus, knowing the collision velocity from the programmed impact trajectory, the velocity versus time may also be obtained and a double integration with the conditions $z=o$, $t=o$ yields the depth of penetration curve. Additionally, the rise time, the total pulse duration and the character of the pulse can be acquired from the record.

Implementation of the full program requires the establishment of a scale of hardness with earth materials as applicable to the invention probe and relating data obtained from the probe to the information acquired from the earth simulations. The penetration properties of the lunar surface, or the surfaces of other extraterrestrial bodies, will then be defined in terms of samples prepared of known earth materials.

Acquisition of useful information about the character and composition of a lunar area from point sampling requires extrapolation between the points of actual contact. The confidence level with which an entire area can be described depends proportionately upon the number and distribution of sampled points and upon the homogeneity of the area covered by the probing program. As the number of probes in a selected area increases and the unhomogeneity of the area decreases, the confidence level increases proportionately. The homogeneity of the object area is ascertained from the similarity of information from the sampling points and from certain other non-contact data and observations.

Statistical studies have been made and are continuing to be made on types of crustal materials, impact and penetration data, grain size and shape of media that may be encountered and on environmental effects of vacuum, gravity, temperature and radiation.

Further, much data has been accumulated and both theoretical and empirical information formulated which may be related and applied to the present probe system for predicting the results of an impact upon or penetration into surface compositions of basic earth materials such as hard rock, conglomerates, dust, rubble, pumice and various combinations of the above. As to possible homologous lunar surfaces, the interpretations of the composition and structure of the lunar surface to data have been made from observations of relatively mediocre resolution. Since the area that the probe impacts is small the lunar surface at the impact point may vary over a wide range of possible types. From temperature measurements it has been calculated that approximately five percent of the region is composed of bare rock (Jaeger and Harper, 1950). These rocks are believed to be similar in character to an earth basalt.

Various areas of the lunar surface are deemed to be composed of a layer of dust. However, it is of unknown particle size and shape, cohesive force and depth. The dust may be very deep and very weak as well as highly porous, barely capable of supporting its own weight, in which case the depth of penetration of the probe may be of considerable magnitude, or, it may have some degree of strength due to large cohesive forces on cementing agents binding the grains.

Further, there may be rubble present in certain areas, i.e., fragments of various sizes ranging from dust particles on the order of 10 microns to very large fragments of as much as a mile in diameter. Such rubble may be at depths of from zero to hundreds of meters (Salisbury and Smalley, 1963). Another possibility exists wherein a hard rock type surface may be covered by a thin or relatively thick layer of dust.

A lunar pumice may also exist. Any such pumice, due to its formation in a low gravity and ultra-high vacuum, would in all probability be considerably more porous than any earth type. The maximum possible porosity is unknown but it may be influenced by the lunar effects in a manner similar to the formation of a granular material of fine particles with a cohesive force acting between grains, in which case it could be as high as 85–90 percent. Our reference to lunar pumice presumes any pumice-like material or frothy igneous rock.

In a more finite vein, statistical studies were made and empirical data developed and published by Baldwin (1949) and from his work on modern artillery experiments the values of constants $d$ and B for some typical earth materials have been derived; they are, as given by Baldwin (1949):

where:

$d=$ approx. degree to which the impacted material can be compacted.

$B=$ ability of probe to move the impacted material and impart kinetic energy to it.

| Material | Ct | B |
|---|---|---|
| Sand mixed with gravel | 435×10³ | 88 |
| Sand mixed with mixture of sand and gravel | 600×10³ | 120 |
| Concrete | 43.4×10⁶ | 40.5 |
| Loam | 1,045×10³ | 36.8 |
| Damp clay | 266×10³ | 21.7 |
| Moistened clay | 92×10³ | 7.35 |

Inasmuch as the physical character of the local lunar surface at the impact point could vary over wide limits the probe is so constructed and instrumented that it is capable of discerning each of a wide range of decelerations that it may be called upon to undergo. Accelerometers are now within the state-of-the-art and commercially available which traverse a range of from less than a few hundredths of an earth $g$ to tens of thousands of earth's $g$'s.

Since the deceleration experienced in first contacting the weakest, most porous, fine grain dust possible on the lunar surface could well be almost negligible and therefore extremely difficult to detect with accelerometers, a contact membrane 9 (FIGURE 1) may be optionally added to the probe's surface 11 to cover such contingency. This may be made of any suitable foil-like or thin gauge electrically conductive material such as 52S aluminum foil and is so arranged that the circuit is closed and an impulse generated by the slightest deflection of its surface.

A further optional embodiment consists in the addition of three axially aligned, orthogonal spin rate indicators 8, to the preferred embodiment described above. These may be desirable, on occasion, when the delivery apparatus is so constituted that the spherical probe body is subjected to a spin prior to impact.

The range of penetration strength over which the probe may be utilized can be varied by the simple expedient of changing the characteristics of the pressure sensitive transducers and survival strength of the globe itself. It is here noted, however, that destruction of the sphere by the impact is also a general indication of the penetration resistance of the object medium.

Figure 4:
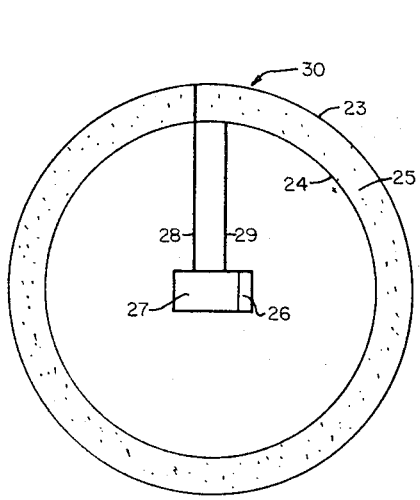
FIGURE 4 is a cross-sectional view of a variable wall strength embodiment of the present invention.

A second embodiment of the invention is shown in schematic in FIGURE 4. Here an outer wall 23 and an inner wall 24 define a spherical globe-like inertial probe 30. Such walls may be of various gauges in thickness and of materials having various strengths, so that where the object medium 22, FIGURE 3 exhibits sufficient penetration resistance the sphere will buckle inwardly upon impact and be distorted or destroyed thus causing wall 23, FIGURE 4, to penetrate a suitable low density filler material 25, such as plastic foam, and come into electrical contact with wall conductor 24. This contact closes the simple electrical switching circuit from power source 26 and energizes transmitter 27 which, in turn, is caused to emit a signal 19 (FIGURE 3) to a remote receiver (not shown) in vehicle 20.

Figure 5:
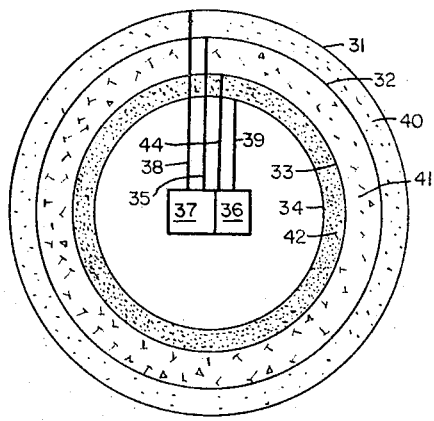
FIGURE 5 is a yet further embodiment, illustrating a multi-wall, variable impact construction of the invented inertial probe.

Another embodiment may be constructed as shown in FIGURE 5. Here the strength of walls 31, 32, 33 and 34 are of incrementally varying known strengths and filler materials 40, 41 and 42 may either be of like material of varying densities and texture or may be of different materials having predetermined textures, strengths and densities. Each wall, upon contact with another wall closes its respective circuit whereupon an electric pulse is initiated and transmitted as in FIGURE 4. This is accomplished through circuit conduits 38, 35, 39 and 44 and power source 37 to transmitter 36. The latter thence transmits an intelligible signal to the remote receiver in vehicle 20, FIGURE 3, at some selected distance from the impact site.

From data thus received the deceleration vector is resolved and plotted, in a conventional manner, as a function of time.

As thus, described, the present invention resides in a method and means operable for impacting a data transmitting spherical impact probe upon a lunar surface or other extraterrestrial body and measuring, metering and recording its deceleration history; thus providing a novel yet realtively simple and economical system for predetermining, with a high level of confidence, the ability of the surface to sustain a manned landing of a space vehicle thereon.

What is claimed is:
1. In a probe device operative to measure an object material's resistance-to-penetration, the combination comprising:
   (A) a spherical hard metal capsule defining an enclosure, and carrying
   (B) an electrical energy power source mounted within said enclosure,
   (C) at least one orthogonal decelerometer operatively associated with said power source and suitably disposed and mounted within said enclosure,
   (D) at least one input channel for electrical pulses emanating from said decelerometer and leading into a subcarrier means,
   (E) a subcarrier having at least one oscillator, operatively associated with prime carrier means,
   (F) a prime VHF carrier, frequency modulated by the input from said subcarrier and having at least one RF oscillator for emitting VHF band crystal controlled signals,
   (G) a transmitter for receiving input from said prime carrier operable to provide RF signal emission for telemetering,
   (H) at least one polarized, phased band, omnidirectional antenna in operative association with said prime carrier, said antenna being peripherically disposed about said spherical capsule probe,
   (I) at least one relatively thin metallic outer shell defining an enclosure for said metal capsule spaced therefrom and substantially concentric therewith, and further having suitably disposed non-conductive spacer material between said outer shell and said metal capsule such that no electrical contact exists between said outer shell and said inner capsule.

References Cited
UNITED STATES PATENTS

| | | | |
|---|---|---|---|
| 2,796,760 | 6/1957 | Warlam | 73—82 |
| 2,958,522 | 11/1960 | Slater | 73—504 |
| 2,976,732 | 3/1961 | Hautly | 73—11 |
| 3,298,222 | 1/1967 | Costello et al. | 73—12 |

RICHARD C. QUEISSER, *Primary Examiner.*

JAMES GILL, *Examiner.*

C. I. McCLELLAND, *Assistant Examiner.*